United States Patent
Thompson et al.

(10) Patent No.: US 8,955,262 B2
(45) Date of Patent: Feb. 17, 2015

(54) ABOVEGROUND SAFETY SHELTER

(71) Applicants: Keith Thompson, Norman, OK (US); Clint Algood, Edmond, OK (US)

(72) Inventors: Keith Thompson, Norman, OK (US); Clint Algood, Edmond, OK (US)

(*) Notice: Subject to any disclaimer, the term of this patent is extended or adjusted under 35 U.S.C. 154(b) by 0 days.

(21) Appl. No.: 13/750,838

(22) Filed: Jan. 25, 2013

(65) Prior Publication Data

US 2014/0208667 A1     Jul. 31, 2014

(51) Int. Cl.
*E04H 9/00*     (2006.01)
*E04H 9/14*     (2006.01)

(52) U.S. Cl.
CPC .................................. *E04H 9/14* (2013.01)
USPC ............... 52/79.9; 52/143; 52/169.6

(58) Field of Classification Search
USPC .......... 52/169.6, 79.1, 79.4, 2.25, 143, 745.2, 52/79.5, 79.6, 79.9, 79.11, 79.12; 109/1 S, 109/1 V See application file for complete search history.

(56) References Cited

U.S. PATENT DOCUMENTS

| | | | |
|---|---|---|---|
| 984,942 A * | 2/1911 | Leddy | 52/169.6 |
| 2,629,348 A * | 2/1953 | Kifferstein | 109/58 |
| 2,792,794 A * | 5/1957 | Miller | 52/66 |
| 2,871,802 A * | 2/1959 | Fishler | 109/1 S |
| 2,968,130 A * | 1/1961 | Bascom | 52/206 |
| 3,038,565 A | 6/1962 | Bruce | |
| 3,049,835 A * | 8/1962 | Sundstrum | 52/169.6 |
| 3,118,401 A * | 1/1964 | Platt | 109/1 S |
| 3,138,124 A * | 6/1964 | Baier | 109/1 S |
| 3,159,117 A * | 12/1964 | Rosenfeld | 109/1 S |
| 3,173,387 A * | 3/1965 | Cree, Jr. | 109/1 S |
| 3,196,813 A * | 7/1965 | McHugh, Jr. | 109/1 S |
| 3,387,733 A * | 6/1968 | Field | 217/12 R |
| 3,599,808 A * | 8/1971 | Bisson | 414/12 |
| 4,065,885 A * | 1/1978 | Blick et al. | 52/143 |
| 4,534,144 A * | 8/1985 | Gustafsson et al. | 52/169.6 |
| 4,539,780 A * | 9/1985 | Rice | 52/169.6 |
| 4,615,158 A | 10/1986 | Thornton | |
| 4,642,952 A * | 2/1987 | Prandin | 52/169.6 |
| 4,805,360 A * | 2/1989 | Kuehnl | 52/169.1 |
| 4,955,166 A * | 9/1990 | Qualline et al. | 52/169.6 |
| 5,115,613 A * | 5/1992 | McCarthy | 52/169.6 |
| 5,671,568 A | 9/1997 | Armanno, Sr. | |
| 5,749,181 A * | 5/1998 | Bauman | 52/169.6 |
| 5,829,208 A | 11/1998 | Townley | |
| 5,930,961 A | 8/1999 | Beaudet | |
| 6,061,976 A | 5/2000 | Willbanks, Jr. | |
| 6,085,475 A | 7/2000 | Parks | |
| 6,131,343 A | 10/2000 | Jackson, Jr. | |
| 6,151,841 A | 11/2000 | Green | |
| 6,226,932 B1 | 5/2001 | Friedrich | |
| 6,334,278 B1 | 1/2002 | Arnold | |
| 6,343,443 B1 | 2/2002 | Tylicki, Jr. | |
| 6,385,919 B1 | 5/2002 | McCarthy | |
| 6,385,920 B1 | 5/2002 | Chandler | |
| 6,393,776 B1 | 5/2002 | Waller | |
| 6,415,558 B1 | 7/2002 | Cherry | |
| 6,434,896 B1 | 8/2002 | Mitchell | |
| 6,481,166 B2 | 11/2002 | Shelton | |
| 6,507,958 B1 * | 1/2003 | Tagg | 4/321 |

(Continued)

*Primary Examiner* — James Ference
(74) *Attorney, Agent, or Firm* — McAfee & Taft

(57) ABSTRACT

A mobile aboveground safety shelter to provide protection from dangerous events such as storms, tornadoes and similar occurrences is provided. The shelter includes a pallet and a room connected to the pallet. The pallet has a generally planer base and a wall extending upward from the base. The wall and base form a cavity suitable for containing a weighting material.

2 Claims, 4 Drawing Sheets

(56) References Cited

U.S. PATENT DOCUMENTS

| | | |
|---|---|---|
| 6,539,674 B2 * | 4/2003 | Arnold .................. 52/79.1 |
| 6,581,337 B1 * | 6/2003 | Skov et al. ............. 52/79.5 |
| 6,595,722 B2 | 7/2003 | McCavour |
| 6,938,381 B1 | 9/2005 | Villa |
| 6,948,281 B1 * | 9/2005 | Carmichael ............... 52/86 |
| 7,533,942 B2 * | 5/2009 | Kennedy et al. ........... 299/12 |
| 7,797,888 B2 | 9/2010 | Serrano |
| 8,136,303 B2 | 3/2012 | Scott, IV |
| 8,245,450 B2 | 8/2012 | Scott |
| 8,375,642 B1 | 2/2013 | Scott, IV |
| D685,921 S | 7/2013 | Scott, IV |
| 8,534,001 B2 | 9/2013 | Scott, IV |
| 8,555,559 B2 * | 10/2013 | DiGregory ............... 52/79.5 |
| 2001/0037615 A1 * | 11/2001 | Riech .................... 52/79.1 |
| 2002/0124490 A1 | 9/2002 | McCarthy |
| 2003/0126805 A1 * | 7/2003 | Roberts .................. 52/80.1 |
| 2003/0140573 A1 * | 7/2003 | Marcinkowski et al. ..... 52/79.5 |
| 2005/0241593 A1 * | 11/2005 | Kaura .................... 119/496 |
| 2006/0048458 A1 * | 3/2006 | Donald et al. ............ 52/69 |
| 2009/0025307 A1 | 1/2009 | Crichlow |
| 2009/0313925 A1 * | 12/2009 | Lyons et al. .............. 52/274 |
| 2010/0088974 A1 * | 4/2010 | Scott, IV ................. 52/79.5 |
| 2010/0115858 A1 | 5/2010 | Olsen |
| 2010/0192480 A1 * | 8/2010 | Derose .................. 52/79.1 |
| 2011/0185644 A1 * | 8/2011 | Hutter ................... 52/79.1 |
| 2012/0285104 A1 * | 11/2012 | Digregory ............... 52/79.5 |

* cited by examiner

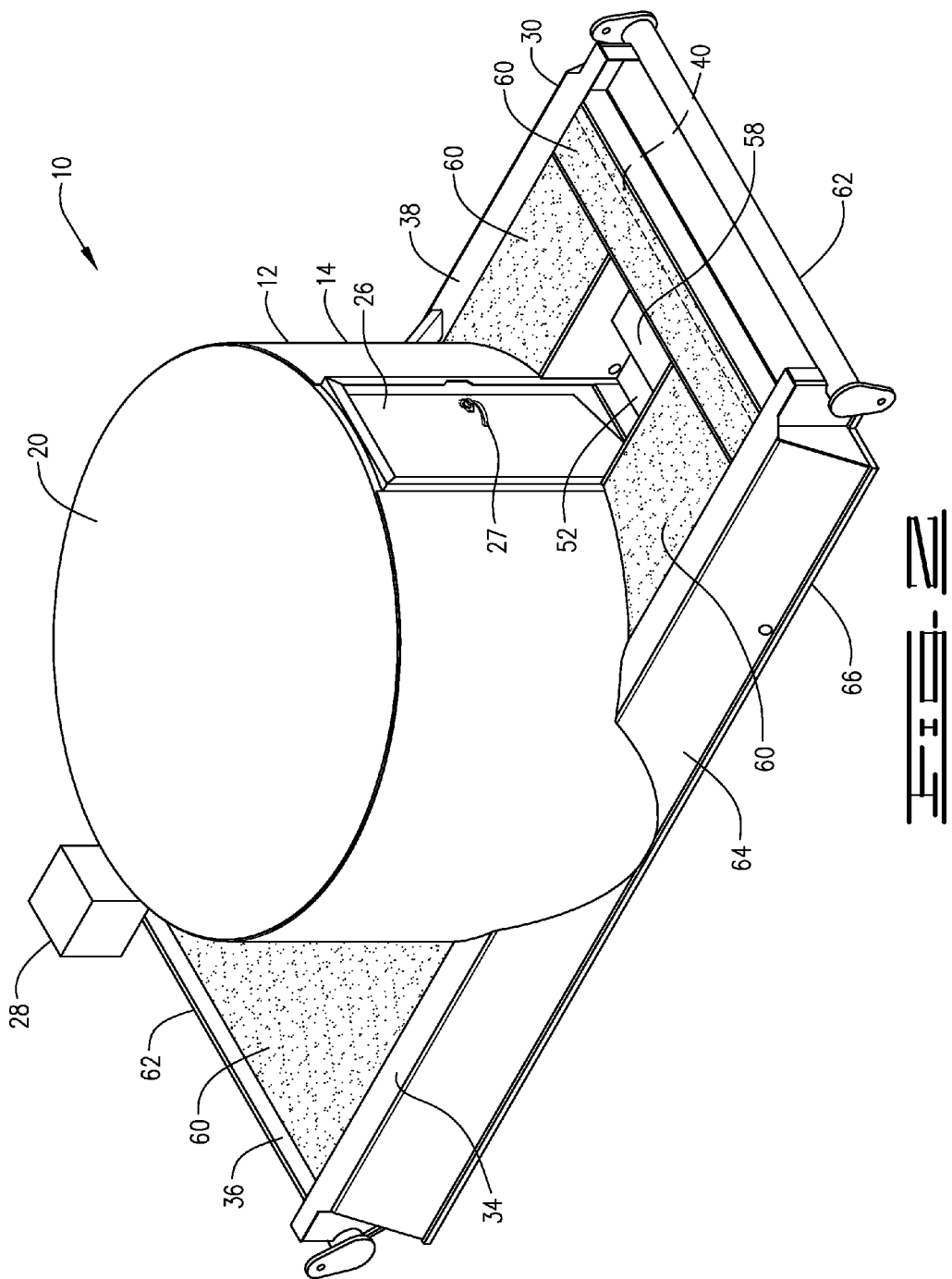

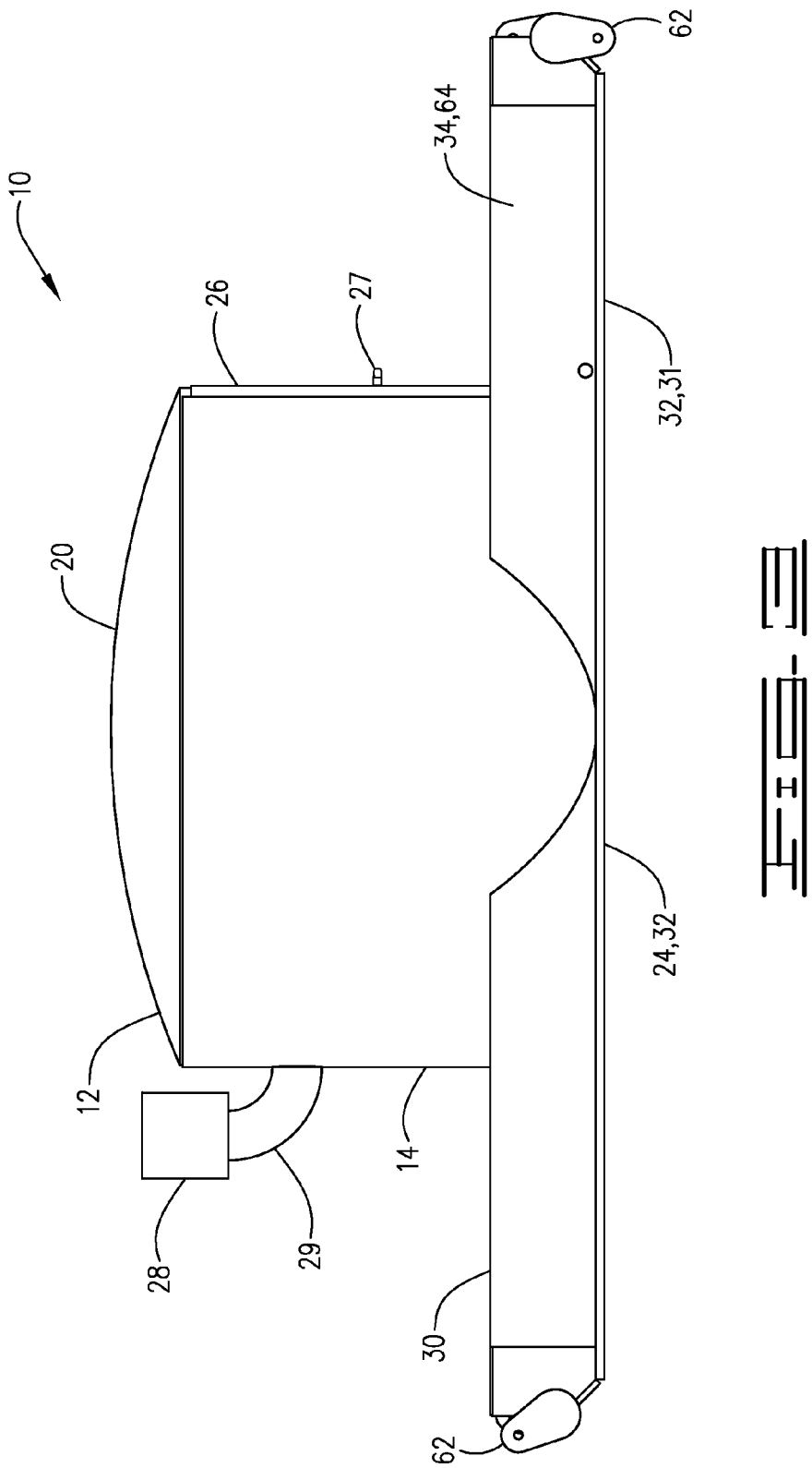

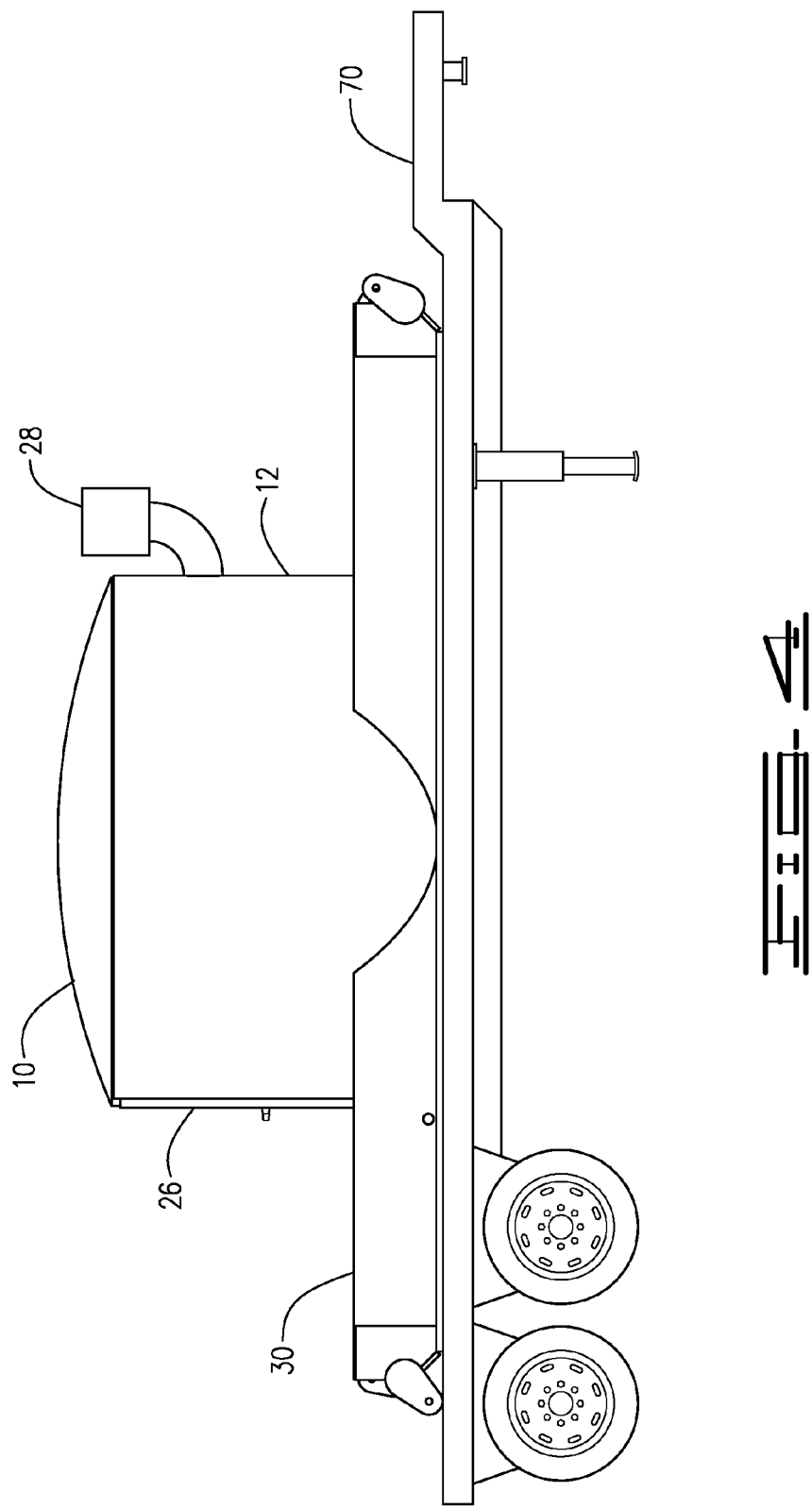

ABOVEGROUND SAFETY SHELTER

FIELD OF THE INVENTION

The present invention relates to safety shelters used to provide protection from dangerous events such as storms, tornadoes and similar occurrences. More specifically, the present invention relates to aboveground safety shelters.

BACKGROUND OF THE INVENTION

There are many parts of the world that are periodically exposed to storms, tornadoes and other severe wind conditions. Conventional aboveground safety shelters are either built belowground or depend almost completely upon attachment to a concrete foundation or ground anchors to resist movement. To resist wind induced overturning, uplift and sliding, such concrete foundations are generally comprised of expensive subterranean concrete footings. Some conventional metal shelters can be unbolted from their heavy concrete foundations for movement to a new location; however, each new location requires the preparation of another heavy concrete foundation to which the shelter can be bolted. In most instances the cost and inconvenience of pouring of a new foundation (and the attendant environmental impact of their subsequent demolition and removal) renders impracticable the redeployment of a metal protective shelter for temporary use.

SUMMARY OF THE INVENTION

In accordance with one embodiment of the invention there is provided an aboveground safety shelter comprising a pallet and a room. The pallet has a generally planer base and a wall extending upward from the base wherein the base and the wall form a cavity suitable for containing a weighting material. The room is connected to the pallet. The pallet and room are configured such that, when the weighting material is added to the cavity, the shelter resists movement in storms without additional anchoring means or belowground components.

In accordance with another embodiment of the invention there is provided a method of deploying an aboveground safety shelter. The method comprising:
(a) transporting, to an installation site having a ground surface, the shelter including:
  a pallet having a generally planer base and a wall extending upward from the base wherein the base and the wall form a cavity suitable for containing a weighting material; and
  a room connected to the pallet wherein the pallet and cylindrical room are configured such that, when the weighting material is added to the cavity, the shelter resists movement in storms without additional anchoring means or belowground components;
(b) placing the shelter on the ground surface; and
(c) introducing the weighting material into the cavity.

BRIEF DESCRIPTION OF THE DRAWINGS

FIG. 2 is a perspective view of the safety shelter of FIG. 1 shown with the weighting material added.

FIG. 3 is a side view of the safety shelter of FIG. 1.

FIG. 4 is a side view of the safety shelter of FIG. 1 shown on a roll-off container transport trailer.

DESCRIPTION OF EXEMPLARY EMBODIMENTS

Figure 1:
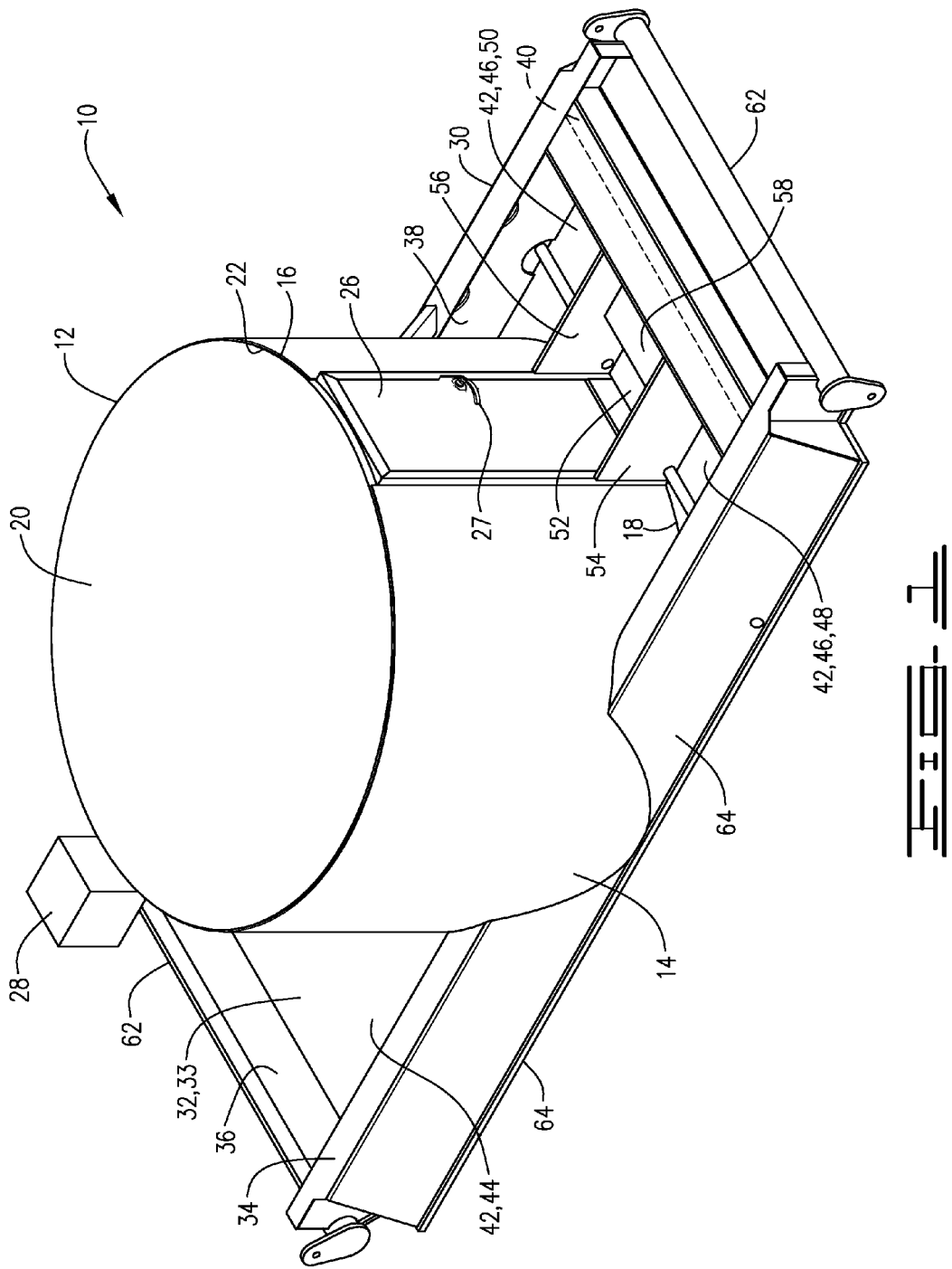
FIG. 1 is a perspective view of a safety shelter in accordance with one embodiment of the present invention which is shown without the presence of a weighting material.

With reference now to FIGS. 1-3, there is illustrated an aboveground safety shelter 10 in accordance with one embodiment of the current invention. Safety shelter 10 generally includes a room 12 and a skid or pallet 30. Safety shelter 10 relies on a weighting material 60 contained in pallet 30, along with the weight of the material of construction for safety shelter 10, to provide the majority of resistance, and preferably the primary resistance, to overturning, uplifting and sliding caused by storms having severe wind conditions such as tornadoes and hurricanes. While weighting material 60, along with the weight of the material of construction for the safety shelter, provides the primary resistance, secondary resistance can be provided by the shape of the storm shelter, as further described below; however safety shelter 10 does not rely on anchoring means or belowground components, such as poured ground foundations, in ground anchors or stabilizing arms. By "primary resistance" it is meant that the design of safety shelter 10 is such that weighting material 60, along with weight of the material of construction of the safety shelter, can provide all the resistance necessary to meet or exceed limits established by the National Storm Shelter Association (NSSA) standard, the Federal Emergency Management Agency (FEMA) standards, the American Society of Civil Engineers (ASCE) standards and/or the ICC/NSSA 500 standard to prevent overturn, uplifts and sliding caused by severe wind conditions without reliance on the secondary resistance provided by the shape of the storm shelter and without reliance upon additional anchoring means or belowground components. Additionally, it is preferred that the weight of the storm shelter be concentrated below the top of the pallet to increase resistance to overturning, uplifting and sliding by creating a lower center of gravity for the storm shelter. Accordingly, at least 60% of the weight of the storm shelter can be in the pallet after addition of the weighting material. Generally, at least 70% of the weight of the storm shelter can be in the pallet after addition of the weighting material. For some embodiments, at least 80% or even at least 90% of the weight of the storm shelter can be in the pallet after addition of the weighting material.

Returning now to FIGS. 1-3, room 12 has a generally cylindrical shape. The cylindrical shape helps facilitate air flow around room 12 so that torque and movement of room 12 caused by high wind conditions are reduced. Room 12 can have other shapes but ones that facilitate air flow around room 12 are preferred, such as room shapes that have simple curved shapes; for example ones that are circular or oval in cross-section. Additionally, such curved shapes help deflect impact from air borne debris and, thus, reduces the chance of penetration.

Room 12 comprises a wall 14, a roof 20, a floor 24 and door 26. Wall 14 has upper end 16 and lower end 18. Wall 14 is shown as being a cylindrical wall but wall 14 can have other shapes. Generally, wall 14 can have a simple curved cross-sectional shape, as described above for room 12, and preferably can have a cylindrical shape; that is, a circular cross-section. As can best be seen by FIG. 3, roof 20 is connected along edge 22 to upper end 16 of wall 14. Roof 20 can be attached by welding or other means to secure it to or make it integral with pallet wall 14. Roof 20 has a curved contour such that it is higher near the center of the room than at the walls. A curved contour, while not required, is believed to provide secondary resistance against overturns and sliding because of its aerodynamic structure. Additionally, a curved contour helps deflect impact from air borne debris and thus, reduces the chance of penetration. Generally, where wall 14 is cylindrical, roof 20 can be in the form of spherical cap. Floor 24 is connected to lower end 18 of wall 14. Floor 24 can be formed from part of base 32 of pallet 30.

As best seen in FIGS. 1 and 2, room 12 has door 26 for accessing the interior of room 12; that is, for allowing ingress into and egress out of room 12. It is preferred that door 26 be configured so that debris that falls outside door 26 cannot block it from functioning. Accordingly, it is preferred that door 26 mounted inside room 12 or so that it opens inward into room 12. Thus, in one embodiment door 26 can be a sliding door mounted on the interior of wall 14. In another embodiment door 26 is hinged mounted and opens into the interior of room 12, as illustrated in FIG. 2. Also, latch 27 is provided for securing door 26 during severe weather conditions. Additionally, room 12 can have a turbine vent 28 connected by vent duct 29 in order to provide ventilation for room 12.

Pallet 30 is shown as having a generally rectangular shape. The rectangular shape facilitates loading on a trailer and moving of safety shelter 10; however, other shapes can be used if desired, such as square, oval or oblong. Pallet 30 comprises base 32, side walls 34 and 38, and end walls 36 and 40. Base 32 comprises a bottom planer surface 31 and a top planer surface 33. Typically, bottom planer surface 31 is designed to fit flush on the ground surface of the installation site without any gaps, holes or other voids that would allow wind to get underneath base 32.

Walls 34, 36, 38 and 40 extend upward from base 32 to form one or more cavities 42, as further described below. Room 12 is attached to pallet 30 and a portion of base 32 can serve as the floor 24 of room 12. Room 12 can be attached by welding or other means to secure it to or make it integral with pallet 30. Additionally, room 12 can extend across pallet 30 so as to extend into and/or form a portion of side walls 34 and 38, as illustrated in the figures. Accordingly, side walls 34 and 38 and end wall 36 form three sides of first cavity 44 with wall 14 of room 12 serving as the fourth side of first cavity 44. Similarly, walls 14, 34, 38 and 40 form second cavity 46. Second cavity 46 is further divided into an entry way 52, and a first portion 48 and a second portion 50 located on each side of entry way 52. Entry way 52 is defined by a first wall 54 and second wall 56 and has stair 58. Entry way 52 allows for door 26 to extend downward adjacent to base 32 by defining a cavity portion where there is no weighting material, best seen in FIG. 2. Thus, entry way 52 allows for a taller door, without adding height to room 12, than would be allowed if entry way 52 were filled with weighting material.

As shown in FIG. 2, first cavity 44, and first portion 48 and second portion 50 of second cavity 46 are filled with a weighting material 60 when the safety shelter 10 is configured for use as a storm shelter. Weighting material 60 can be any material that has suitable weight so that safety shelter 10 resists uplifts, overturns and sliding. Generally, the type and amount of weighting material 60 should be sufficient to provide safety shelter 60 with enough resistance to overturn, uplifts and sliding to meet NSSA, FEMA, ASCE and/or ICA/NSSA standards. Typically, concrete can be used as the weighting material because it can be readily added to cavities 42 either before or after the safety shelter's initial placement and, once hardened, is not subject to being blown-out under severe wind conditions. Optionally, other weighting materials can be used. If a substance susceptible to being blown-out, such as sand is selected, then it can necessitate a top being attached to pallet 30 over cavities 42 to ensure that a suitable amount of weighting material is retained in the cavities during servere wind conditions in order to resist uplifts, overturns and sliding. While the amount of weighting material will be dependent upon the particular dimensions of the safety shelter, generally cavities 42 can contain a total weighting material of at least 14,000 pounds and can contain a total weighting material of at least 20,000 lbs or even at least 25,000 pounds. As mentioned above, most of the weight of the safety shelter will be in the pallet, thus once cavities 42 are filled, the pallet can weigh over 24,000 pounds, can be over 30,000 pounds, and can be over 40,000 pounds.

Pallet 30 can have other features such as tow bars 62, which aid in the loading and unloading of safety shelter 10 from a trailer, such as a roll-off container transport. Additionally, walls 34 and 38 can have inclined outer surfaces 64, which are at an acute angle to base 32 and, thus, form a side edge 66 that can dig into the ground if lateral sliding occurs and, hence, aid in resisting such lateral motion.

Where applicable, the components for safety shelter 10 are formed from a material suitable to resist breakage and penetration during severe wind conditions from stresses both caused by the wind and by flying debris. For example, room 12 should be composed of a material suitable to prevent penetration from flying debris. In the past, such rooms have been constructed of layers of metal and concrete. It is an advantage of the current design that the primary weighting of the safety room is in the pallet; thus, room 12 can be more economically made from metal alone. Additionally, this construction provides for a lower center of gravity to provide better resistance to overturns, uplifts and sliding and aids in the portability of safety shelter 10. Generally, safety shelter 10 will be primarily constructed of metal formed and/or welded together and of sufficient strength to protect occupants and contents of safety shelter 10 from severe winds (typically, winds exceeding about 50 mph and which can exceed 150 mph or even 250 mph) and impact from associated wind borne debris. By "primarily constructed" it is meant that at least the pallet base 32 and walls 34, 36, 38 and 40 and room wall 14, roof 20, floor 24 and door 26 are constructed of metal. Typically, they will be formed from structural steel. Suitable structural steels are grades A36, A572 Grade 50 and similar. Generally, the steel will have a thickness from 1 inch to 1.5 inches; however, the steel should be of sufficient size and grade to meet or exceed deflection and penetration limits established by the National Storm Shelter Association (NSSA) standard, the Federal Emergency Management Agency (FEMA) standards, the American Society of Civil Engineers (ASCE) standards and/or the ICC/NSSA 500 standard. Lesser or greater material thickness, types and strengths can alternatively be used.

When cavities 42 are filled with weighting material, pallet 30 is low and flat; that is, generally planer so as to be close to the ground and to thus, minimize wind forces on pallet 30. Safety shelter 10 is sized so as to facilitate relocation and yet still ensure adequate resistance to severe wind. Accordingly, a typical safety shelter can have a pallet 30 with a width of about 7 feet to about 12 feet and a length of from about 16 feet to about 24 feet, and can have a width of about 10 feet and a length of about 20 feet. The width of room 12, which for cylindrical rooms will be the diameter, can be equal to or less than the width of the pallet. Typically, the width of room 12 is about the same as the width of pallet 30; hence, can be about 7 feet to about 12 feet, and can be about 10 feet. More generally, in order to provide suitable size cavities 42 for weighting material 60, the length of pallet 30 can be more than 150% the width of pallet 30 or the width of room 12, and can be more than 175% of the width of pallet 30 or the width of room 12 and often can be about 200% or more of the width of pallet 30 or the width of room 12.

Safety shelter 10 can have a height from the bottom of base 32 to the top of roof 20 of less than 8 feet, can be from about 6 feet to less than 8 feet and can be from about 6.5 feet to about 7.5 feet. Typically, room 12 will extend substantially the entire height of the safety shelter but can be less. A pallet meeting the above described dimensions can have a height of from about 15% to about 35% of the height of safety shelter 10, can have height from 20% to 30% of the height of safety shelter 10, and typically, can have a height of about 25% of the height of safety shelter 10.

In accordance with the above, an exemplary safety shelter could be 20 feet long and 10 feet wide having safety shelter height of 7 feet 2 inches and a pallet height of about 1 foot 7 inches. When the weighting material is added the exemplary safety shelter would be about 44,000 pounds with about 40,000 pounds being attributed to the pallet (including weighting material).

Turning now to FIG. 4, there is depicted a side view of safety shelter 10 shown on a transport trailer 70. Safety shelter 10 is ready for transport to an installation site for use. Safety shelter 10 can be loaded on to the trailer 70 by conventional means such as using a winch to drag the safety shelter up a ramp onto the trailer. Preferably, transport trailer 70 is a roll-off container transport trailer and can be angled by hydraulic or similar adjustment means to form a ramp so that safety shelter 10 can be loaded and unloaded without use of a separate ramp. In accordance with one embodiment of the method of the invention, after it has been loaded onto the transport trailer 70, safety shelter 10 is transported to an initial installation site having a ground surface.

The ground surface of the installation site can be prepared for safety shelter 10 prior to installation. Generally, the only preparation that is needed is leveling off the ground surface so that safety shelter 10 will sit level on the ground. For soft ground, which might be prone to settling, additional ground preparation may be needed such as excavating the top soil so as to reduce settling.

After arrival at the initial installation site safety shelter 10 is unloaded from the trailer 70 and placed on the ground surface. For the initial use of safety shelter 10, weighting material 60 can be added prior to loading on the trailer for transport to the initial installation site. Thus, upon unloading from trailer 70, the safety shelter is ready for use. Alternatively, safety shelter 10 can be transported without the weighting material and weighting material 60 can be introduced into cavities 42 after safety shelter 10 is placed on the ground surface. Thus, safety shelter 10 would be ready for use after an appropriate curing time.

Once safety shelter 10 is no longer needed at the initial installation site, it can be loaded onto a transportation trailer 70 and can be transported to a second or subsequent installation sight having a ground surface. After arrival at the second installation sight, safety shelter 10 is placed on the ground surface of the second installation site and is ready for use.

As has been described, the safety shelter 10 is an aboveground safety or protective shelter, which is capable of redeployment. Safety shelter 10 resists movement in storms without additional anchoring means or belowground components, such as poured ground foundations, in-ground anchors, or stabilizing arms. The above described safety shelter is capable of protecting people from severe winds up to and even exceeding 250 mph and withstanding uplifting, overturns and sliding forces generated by such winds.

Although the disclosed invention has been shown and described in detail with respect to a preferred embodiment, it will be understood by those skilled in the art that various changes in the form and detailed area may be made without departing from the spirit and scope of this invention as claimed. Thus, while the present invention is well adapted to carry out the object and advantages mentioned as well as those inherent therein, numerous changes may be made by those skilled in the art and such changes are encompassed within the spirit of this invention as defined by the appended claims.

What is claimed is:

1. An aboveground safety shelter having a weight comprising:
   a pallet having a length, a width, a first side wall, a second side wall, a first end wall and a second end wall, said pallet comprising:
   a generally planar base comprising a bottom planar surface and a top planar surface; and
   said first and second side walls and said first and second end walls each a extending upward from said base;
   a room connected to said pallet, said room comprising:
   a room wall attached to said top planar surface such that said top planar surface serves as a floor for said room; and
   a roof;
   wherein said room extends across said width of said pallet such that a first cavity is formed by said top planar surface, said room wall, said first and second side walls and said first end wall, and a second cavity is formed by said top planar surface, said room wall, said first and second side walls and said second end wall;
   wherein said first and second cavities are suitable for containing a weighting material;
   wherein said second cavity comprises a stair and an entryway into said room; and
   wherein said pallet and said room are configured such that, when said first and second cavities contain said weighting material, the weight of said shelter and said weighting material provides a primary resistance against movement of said shelter in storms without reliance on anchoring means or belowground components.

2. The aboveground safety shelter of claim 1 wherein, when said safety shelter is installed at an installation site having a ground surface, the bottom planar surface fits flush on the ground surface of the installation site without any voids which might allow wind to get underneath said base.

* * * * *